(12) United States Patent
Schiller et al.

(10) Patent No.: US 8,297,515 B2
(45) Date of Patent: Oct. 30, 2012

(54) DATA STORAGE MEDIUM WHICH IS IN THE FORM OF A CARD AND HAS A RAISED AREA

(75) Inventors: Christoph Schiller, München (DE); Jens Jansen, Baar (CH)

(73) Assignee: Giesecke & Devrient GmbH, Munich (DE)

( * ) Notice: Subject to any disclaimer, the term of this patent is extended or adjusted under 35 U.S.C. 154(b) by 343 days.

(21) Appl. No.: 12/673,264

(22) PCT Filed: Aug. 13, 2008

(86) PCT No.: PCT/EP2008/006666
§ 371 (c)(1),
(2), (4) Date: Feb. 12, 2010

(87) PCT Pub. No.: WO2009/021730
PCT Pub. Date: Feb. 19, 2009

(65) Prior Publication Data
US 2011/0147463 A1    Jun. 23, 2011

(30) Foreign Application Priority Data
Aug. 14, 2007  (DE) .......................... 10 2007 038 318

(51) Int. Cl.
*G06K 19/06*   (2006.01)
(52) U.S. Cl. ....................................... 235/492; 235/380

(58) Field of Classification Search .................. 235/492, 235/486, 487, 375, 380, 441
See application file for complete search history.

(56) References Cited

U.S. PATENT DOCUMENTS

| | | | |
|---|---|---|---|
| 4,614,861 A | 9/1986 | Pavlov et al. | |
| 4,882,477 A | 11/1989 | Oogita et al. | |
| 5,484,997 A * | 1/1996 | Haynes | .......................... 235/492 |
| 5,550,402 A * | 8/1996 | Nicklaus | ........................ 257/669 |
| 6,283,378 B1 | 9/2001 | Welling | |

FOREIGN PATENT DOCUMENTS

| | | |
|---|---|---|
| DE | 8428701 U1 | 3/1986 |
| DE | 19733348 A1 | 9/1998 |
| DE | 19731983 A1 | 1/1999 |
| WO | 0157789 A1 | 8/2001 |

OTHER PUBLICATIONS

International Search Report in PCT/EP2008/006666, Dec. 4, 20087.

* cited by examiner

*Primary Examiner* — Thien M Le
(74) *Attorney, Agent, or Firm* — Bacon & Thomas, PLLC

(57) ABSTRACT

A method for producing a portable card-shaped data carrier with a high embossing. The method comprises the steps of supplying a planar circuit carrier, integrating the circuit carrier in a card-shaped data carrier body of the data carrier and high embossing the data carrier body. At least one surface area of the circuit carrier and at least one through opening is produced and the data carrier body is high embossed in an embossing area overlapping with the at least one surface area of the circuit carrier. In this fashion an easy high embossing of a corresponding data carrier is rendered possible.

23 Claims, 3 Drawing Sheets

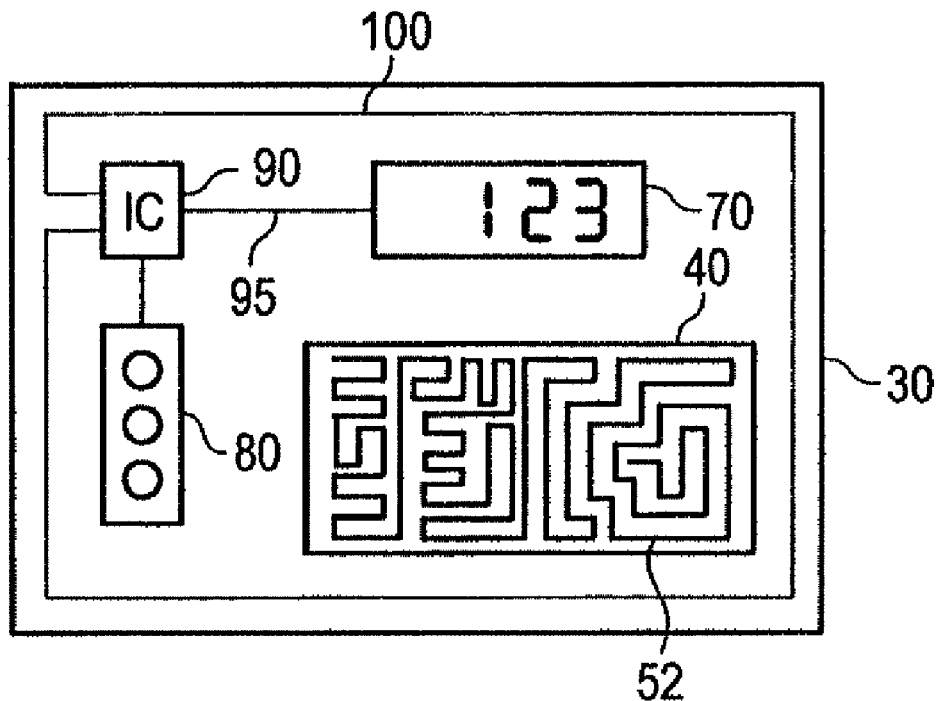
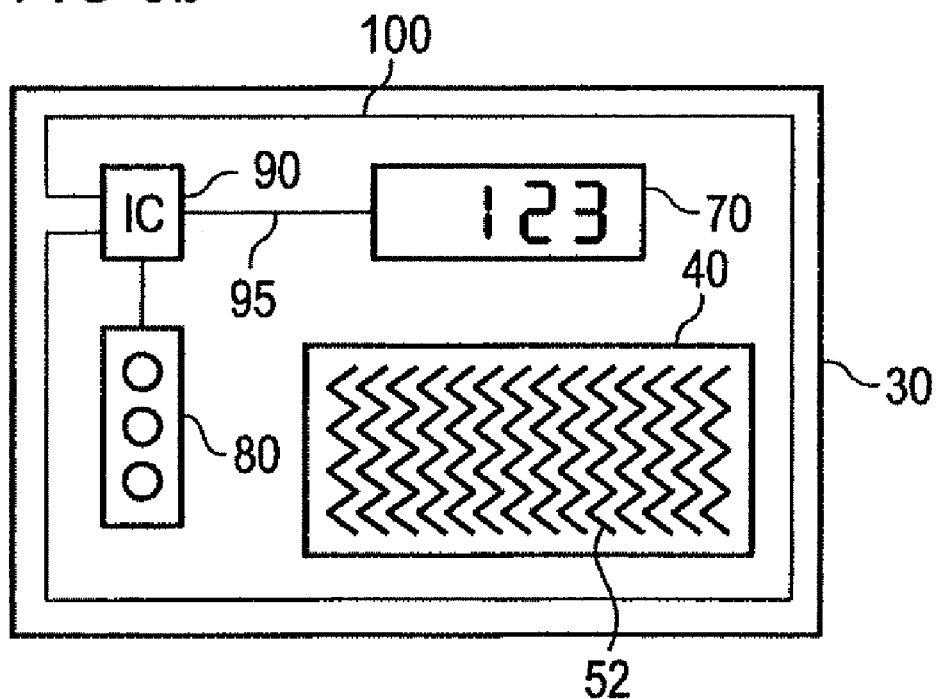

DATA STORAGE MEDIUM WHICH IS IN THE FORM OF A CARD AND HAS A RAISED AREA

FIELD OF THE INVENTION

The present invention relates to a method for producing card-shaped portable data carriers with a high embossing and in particular such data carriers with a planar circuit carrier integrated in the data carrier body of the data carrier, as well as a correspondingly configured circuit carrier.

BACKGROUND

One type of personalization of a card-shaped data carrier consists in providing the data carrier with externally perceivable information concerning the later user of the data carrier. For this purpose for example the name of the user or an identification number characterizing the user is applied on the data carrier body. This can take place e.g. by printing, laser treatment or high embossing.

When a data carrier is high embossed, characters are embossed in the data carrier body in such a fashion that said characters project in a raised and tactilely perceivable fashion from the surface of the data carrier. For this purpose e.g. metal characters are struck onto the material of the data carrier body with great momentum—according to the principle of a mechanical typewriter—, thereby creating the desired high embossing. For this purpose it is necessary that the material of the data carrier body, as a rule a plastic, is permanently deformable. Normally used materials fulfill this requirement.

Data carriers comprising, in addition to an integrated circuit for storing and/or processing data, for example also an output device, e.g. in the form of a display, and/or an input device, e.g. in the form of a keyboard, have a circuit carrier (circuit board). Whereas the integrated circuit is small-surfaced in comparison to the data carrier body, the circuit carrier is large-surfaced.

On such a circuit carrier, which can have almost the same extent as the data carrier body itself, the corresponding electronics for the input and output devices and the connecting lines between the individual components and to the integrated circuit are applied. This circuit carrier is integrated in the data carrier body during the production of the data carrier. In so doing, the different components constituting the data carrier body are connected with the circuit carrier in layered fashion so as to build up the data carrier in layers, with the circuit carrier coming to lie planarly between the components of the data carrier body. Such components are for example various plastic foils, plastic injection-molded elements and the like. Plastic foils are connected with each other and/or to the circuit carrier by laminating. In so doing, space for the circuit carrier and the various components present thereon is left in the components correspondingly, for example in the form of cavities in the injection-molded elements or gaps in the foils.

Due to the arrangement of the described components the planar circuit carrier occupies the complete surface of the data carrier by the exception of a margin area. For this reason the data carrier body is penetrated in its interior by the circuit carrier also in the embossing area in which the high embossing is envisaged. The material of the circuit carrier, for example hard paper (phenolic resin with paper fibers) or a glass fiber mat impregnated with epoxy resin, is sufficiently flexible so as not to impair the required flexibility of the data carrier, but it is very hard to deform permanently, i.e. plastically. This fact considerably complicates the high embossing of the data carrier in an area of the circuit carrier, since for high embossing the data carrier body has to be permanently deformed with regard to its complete thickness, thus including the layer formed by the circuit carrier, which is not allowed by conventional circuit carrier materials without any problem.

SUMMARY

Accordingly it is the object of the invention to enable a high embossing of a data carrier with integrated, planar circuit carrier.

This object is achieved by a method, a data carrier and a circuit carrier having the features of the independent claims. Advantageous embodiments and further developments of the invention are specified in the dependent claims.

The present invention is based on the idea to provide the planar circuit carrier with at least one through opening in one or more surface areas. Therein the surface area is arranged in such a fashion that it overlaps with the embossing area of the data carrier body after the integration of the circuit carrier in the data carrier body. It is thereby ensured that the data carrier body can be easily deformed upon high embossing.

A method for producing a portable card-shaped data carrier comprises the steps of providing the planar circuit carrier, integrating the circuit carrier in the card-shaped data carrier body and high embossing the data carrier body. According to the invention at least one through opening is produced in at least one surface area of the circuit carrier, and the data carrier body is high embossed in an embossing area which overlaps with the surface area of the circuit carrier.

The embossing area of the data carrier body in the context of the present invention is to be understood as that area of the surface of the data carrier body in which a high embossing is in principle envisaged. This means that it is not necessarily the case that the high embossing always takes place actually involving the complete embossing area. However, no high embossing is envisaged outside of the embossing area. The embossing area can also comprise a plurality of partial embossing areas located in different, spatially separated positions of the data carrier body. Correspondingly the circuit carrier then comprises a plurality of inventive surface areas, so as to enable a high embossing in the embossing areas.

The opening or the openings in the at least one surface area of the circuit carrier increase the deformability of the circuit carrier in this area, in particular in the areas adjoining the openings. Thereby also the deformability of the complete data carrier is ensured in the areas of the data carrier body which overlap with this surface area, thus the deformability in the embossing area of the data carrier body. This is based on the circumstance that in the surface area in question, due to the openings, the circuit carrier offers less resistance upon a deformation of the material of the data carrier body. This means that the strongly reduced deformability of the data carrier caused by arranging the circuit carrier in the data carrier body is increased again by producing the through openings.

The openings can consist of a plurality of through slits of a width that is as small as possible. This means that for forming the slits a removal of circuit carrier material is not necessary at all or only to a very small extent. Alternatively or additionally the at least one opening can be formed as a through hole or a plurality of through holes. In so doing, circuit carrier material is removed completely to a certain extent.

An arrangement of slits primarily locally increases the flexibility of the circuit carrier in the area of the slits. The circuit carrier thus yields more easily to an action of force such as occurring in the corresponding area when the data carrier body is high embossed, so that it is easily deformed in the edge area of the slits upon high embossing.

In contrast, if one or more holes are arranged, the circuit carrier material is planarly completely removed in the area of the holes, so that accordingly the circuit carrier does not offer any resistance to a deformation of the data carrier body in this area. Of course slits and holes can both be present in the surface area.

Preferably the openings are produced in the surface area of the circuit carrier before integrating the circuit carrier in the data carrier body. Production methods used so far for producing the circuit carrier then only have to be extended by the step of producing the openings, for example by punching. Thereby further production steps, such as e.g. integrating the circuit carrier and high embossing, can be carried out as so far, for which reason it is possible to effectively adapt hitherto existing production processes to the inventive method. Furthermore damaging the data carrier body is prevented, which would be hard to prevent if the opening was produced in the circuit carrier after integrating the same.

As a rule the planar extent of the surface area of the circuit carrier corresponds to the planar extent of the embossing area of the data carrier body. It is thereby ensured that on the one hand surface areas of the circuit carrier are not unnecessarily provided with through openings. On the other hand, however, it is ensured that in the complete area of the data carrier which is defined by the embossing area of the data carrier body, a subsequent high embossing is made possible by producing the openings.

According to a preferred embodiment the openings are produced in the surface area of the circuit carrier in the form of a plurality of holes, slits or the like or a combination of these or similar elements. The free choice of the shape, the size, the number and the arrangement of these elements or their combinations makes it possible to optimally adapt the type of openings to the material of the circuit carrier, the shape of the surface area, the shape of the embossing area and the high embossing to be expected.

The holes or slits can be produced in the circuit carrier in the form of a regular pattern, e.g. with unvarying spacing or angles between the holes or slits, or in an irregular pattern. Also, a combination of regular and irregular patterns or an apparently random surface arrangement is possible. In this fashion it is e.g. possible to provide regions in the surface area which overlap with always actually high embossed regions of the embossing area with holes or slits according to such a pattern which corresponds to the pattern defined by the always high embossed regions.

Preferably the holes or slits are arranged so that they are distributed over the complete surface of the surface area of the circuit carrier. In case that the surface area overlaps e.g. with the complete embossing area, it is ensured, even if the position of the actual high embossing in the embossing area is not known exactly before, that high embossing is possible in the complete embossing area. On the one hand, such a distribution can take place uniformly, i.e. holes or slits cover the complete surface area with a constant local frequency of occurrence in an almost uniformly distributed fashion. On the other hand, however, also hole patterns or slit patterns which have a locally greater or locally smaller density can be produced in the surface area. Thereby the surface area can be optimally prepared for a correspondingly expected distribution of the high embossing in the embossing area.

In particular the plurality of holes or slits can be produced in the surface area of the circuit carrier in such a fashion that, upon high embossing the data carrier, the circuit carrier is easily deformable in the surface area, in particular in the areas of the holes or slits.

In case the circuit carrier is for example provided with slits in a cruciform pattern, the circuit carrier can be deformed much more easily in a region around the center of the cruciform pattern than without the corresponding slits, since some circuit carrier material is already partly separated from the rest of the circuit carrier by the slits. Different patterns and arrangements are possible. Likewise small holes in the fashion of a perforation can for the same purpose be produced in the circuit carrier in an expediently arranged fashion, such as snake-shaped or meandering contiguous or discontiguous linear slit patterns extending over the complete surface area.

Producing holes in the surface area of the circuit carrier can fulfill a further purpose. In case it is known e.g. in which positions of the embossing area letters or digits can be high embossed, the circuit carrier can be provided with holes in the corresponding areas, said holes having the shape and size of the outlines of the characters to be potentially embossed. During the subsequent high embossing the circuit carrier then offers no resistance at all in exactly these areas of the characters to be embossed, since the circuit carrier material was completely removed in exactly these areas.

In a further embodiment of the inventive method this approach is implemented even more clearly, in that the opening is produced in the surface area of the circuit carrier in such a shape and such a size which respectively correspond to the size and shape of the complete embossing area. This means that the circuit carrier material is substantially completely removed in the complete embossing area.

In each case it can be ensured that the data carrier body, after integration of the circuit carrier and before high embossing, does not have any varying thickness levels and has a constant thickness.

In the case of small-surfaced holes or slits these are preferably produced in the circuit carrier in such shapes and sizes that they prevent a formation of different thickness levels, for example during the production of the data carrier body by laminating various plastic foils surrounding the circuit carrier.

Slits are less problematic in this regard. Holes are preferably to be formed so that they are not too large and not too planar, so that corresponding foils cannot sink into them.

In other cases the at least one opening which is produced in the circuit carrier as one or more planar gaps in the form of the at least one surface area can be filled by means of suitable filling layers, consisting for example of the same material as the rest of the data carrier body. This prevents the formation of different thickness levels in the data carrier body.

In a preferred embodiment the inventive data carrier is a chip card with an output device, e.g. a display, and an input device, e.g. a keyboard. The respective electronics controlling the input and output device are applied on the circuit carrier and connected with each other and with the chip of the chip card by means of connecting lines provided thereon. Preferably no electronics and no connecting lines are present in the surface area of the circuit carrier, at least these lines are not severed by the openings. The circuit carrier can carry further elements, e.g. an antenna of the data carrier configured as a coil. Said antenna is arranged in an edge area of the circuit carrier anyway and can therefore be guided around the surface area easily.

BRIEF DESCRIPTION OF THE DRAWINGS

The invention will hereinafter be described by way of example with reference to the accompanying drawings. The figures are described as follows:

FIGS. 3a and 3b first modified embodiments of the circuit carrier similar to FIG. 1.

DETAILED DESCRIPTION OF EXEMPLARY EMBODIMENTS OF THE DISCLOSURE

Figure 1:
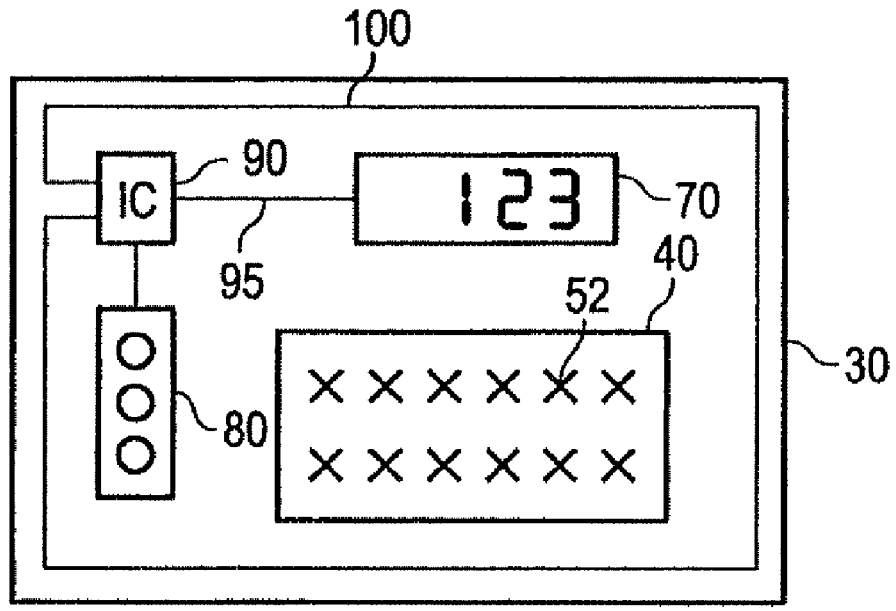
FIG. 1 a first preferred embodiment of an inventive circuit carrier.
Figure 2:
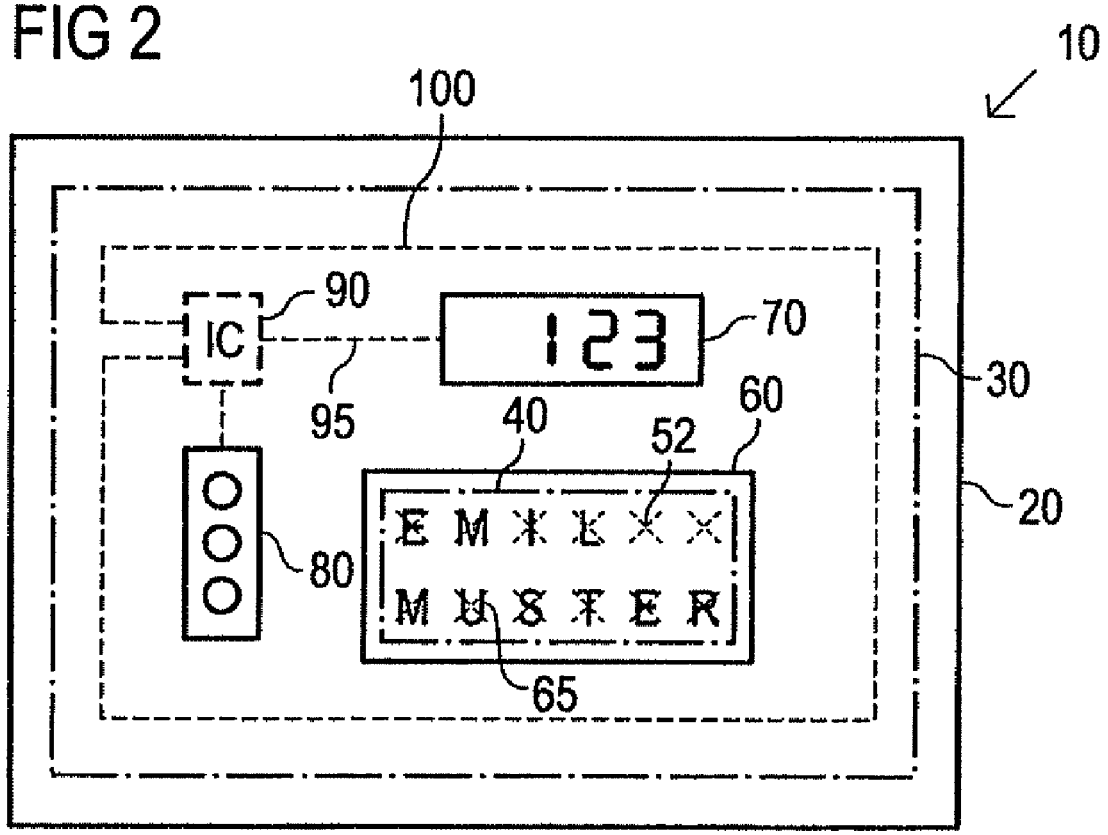
FIG. 2 a preferred embodiment of an inventive data carrier with integrated circuit carrier from FIG. 1.

FIG. 1 shows a circuit carrier 30 adapted to being integrated in a data carrier body 20 of a data carrier 10, as shown schematically in FIG. 2.

With reference to FIG. 1 the planar circuit carrier 30 comprises an integrated circuit 90, an input device 80 in the for in of a keyboard and an output device 70 in the form of a display. Therein the electronics controlling the keyboard 80 and the display 70 are applied directly on the circuit carrier 30 and connected with the integrated circuit 90 by means of connecting lines 95. A coil-shaped antenna 100 is connected with the integrated circuit 90 and arranged along the edge on the circuit carrier 30. The coil can be formed through etching or applying a wound coil. The antenna 100 can also adopt a different shape or can also be omitted entirely. Alternatively or additionally to the keyboard 80 and the display 70 further electronics (not shown) for other or additional functionalities can be present on the circuit carrier 30.

The planar basic body of the circuit carrier 30 is made of a glass fiber mat impregnated with epoxy resin. Other suitable materials are also possible, for example hard paper or the like. In the lower right quadrant of the circuit carrier 30 a surface area 40 is indicated. Therein a plurality of slits 52 are formed which are arranged crosswise in pairs and extend completely throughout the circuit carrier 30, thus representing a through opening. The electronic components (integrated circuit 90, keyboard 80 and display 70 with their control electronics), the connecting lines 95 and the antenna 100 therein are arranged on the circuit carrier 30 in such a fashion that the surface area 40 remains free of them, at least in the area of the slits 52.

FIG. 2 shows the data carrier 10, in whose data carrier body 20 the circuit carrier 30 is integrated. The data carrier body 20 consists of a plurality of plastic foils which are connected with each other through laminating. The circuit carrier 30 therein is integrated as a layer in the data carrier body 20 in such a fashion that in each case at least one plastic foil is arranged on top of and below the circuit carrier 30. For accommodating the components on the circuit carrier 30, e.g. the keyboard 80, the display 70 and the integrated circuit 90, some of the foils have gaps in the corresponding locations. Alternatively injection-molded plastic components, possibly with additional closing-off protective foils, can be used for forming the data carrier body 20. Said components then have corresponding cavities for accommodating the circuit carrier 30 and its components.

The slits 52 in the surface area 40 of the circuit carrier 30 are formed in the circuit carrier 30, for example by punching, before the circuit carrier 30 is integrated in the data carrier body 20.

The surface area 40 indicated in the circuit carrier 30 having the plurality of slits 52 is arranged in the data carrier body 20 in such a fashion that it overlaps with an embossing area 60 of the data carrier body 20. The surface area 40 and the embossing area 60 therein have almost equal planar extents. It is also possible, however, that the surface area 40 overlaps with the embossing area 60 only partly. It is furthermore possible that the surface area 40 and the embossing area 60 or only one of the two consist in each case of different partial surface areas and/or partial embossing areas, which are arranged in different locations on the circuit carrier 30 and/or the data carrier body 20.

In the embossing area 60 the data carrier body 20 is provided with a high embossing 65. The letters forming the high embossing 65 are arranged in such a fashion that they are disposed in each case exactly above one pair of the slits 52. The pattern according to which the slits 52 are arranged in the surface area 40 corresponds exactly to the pattern of the positions in the embossing area 60 in which characters can be high embossed. However, it is not required that a character is high embossed in the area of every pair of slits 52. The data carrier body 20 thereby is sufficiently deformable in exactly those areas in which characters can be high embossed. The slits 52 in the circuit carrier 30, whose material inherently has a very low deformability, neutralize this property locally, so that at least those material sections of the circuit carrier 30 which are directly adjacent to the slits 52 are sufficiently deformable. Thereby an easy high embossing of the data carrier body 20 is rendered possible.

The slits 52 alternatively can have a different shape and different lengths which can also differ from each other. Their arrangement can take place according to other patterns, which can also be irregular or random, as described below with reference to the FIGS. 3a and 3b.

The circuit carrier 30 of FIG. 3a has as a through opening in the surface area 40, instead of the slits 52 regularly arranged in pairs, only one slit 52 which meanders in an irregular pattern across the complete surface area 40. Due to the shape of this slit 52 the circuit carrier 30 is easily deformable along the slit 52, thus in the complete surface area 40, since in each location material of the circuit carrier is already partly detached from the rest of the circuit carrier 30. For the same purpose, however, also a plurality of non-intersecting slits 52 can be produced in the circuit carrier 30, which are arranged side by side, as shown with reference to FIG. 3b. The plurality of slits 52 covers the surface area 40 in a regular zigzag pattern of continuous slits 52 arranged in parallel. The distribution of the slits 52 is uniform therein.

For the easier deformability of the circuit carrier 30 in the surface area 40 instead of the slits 52 small-surfaced holes 54 or large-surfaced openings 56 of a different shape, size, number and arrangement can penetrate the circuit carrier 30, as described below with reference to the FIGS. 4a and 4b.

Figure 4A:
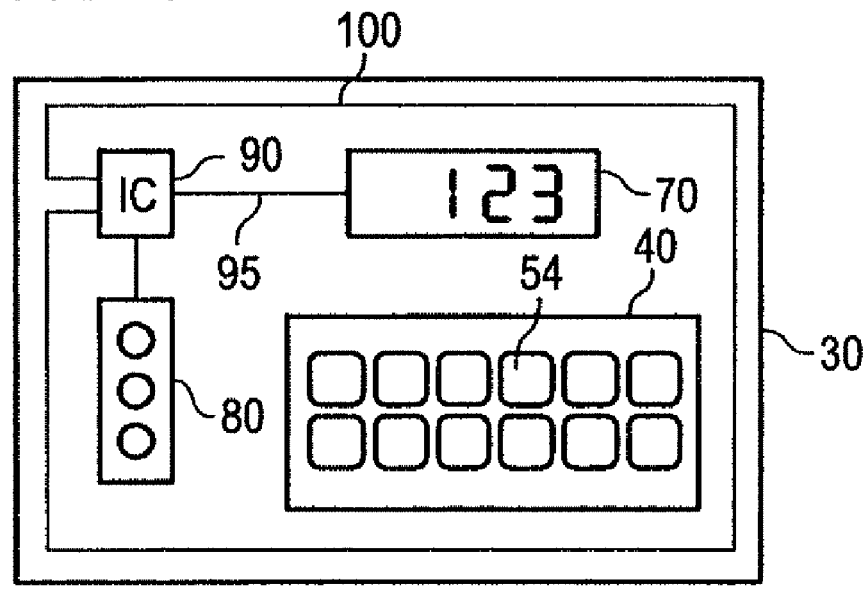
FIGS. 4a and 4b further embodiments of the circuit carrier.

FIG. 4a shows a circuit carrier 30 similar to that in FIG. 1. Instead of the slits 52 intersecting each other in pairs the circuit carrier 30 has small-surfaced holes 54 in the same positions. Due to these holes 54 a high embossing of the data carrier body 20 is rendered possible in the area of the holes 54, since the circuit carrier 30 does not offer any resistance to a deformation of the data carrier body 20 here. The holes 54 are arranged regularly and follow the pattern defined by the positions of the characters to be embossed. Alternatively very small holes arranged closely adjacent (not shown) can act like a perforation in the circuit carrier 30. When the data carrier body 20 then is high embossed in the area of such a perforation, the circuit carrier 30 is deformed more easily along the perforation than without it. Thereby the resistance to deformation offered by the circuit carrier 30 to the data carrier body 20 during high embossing is reduced and the high embossing is facilitated.

Figure 4B:
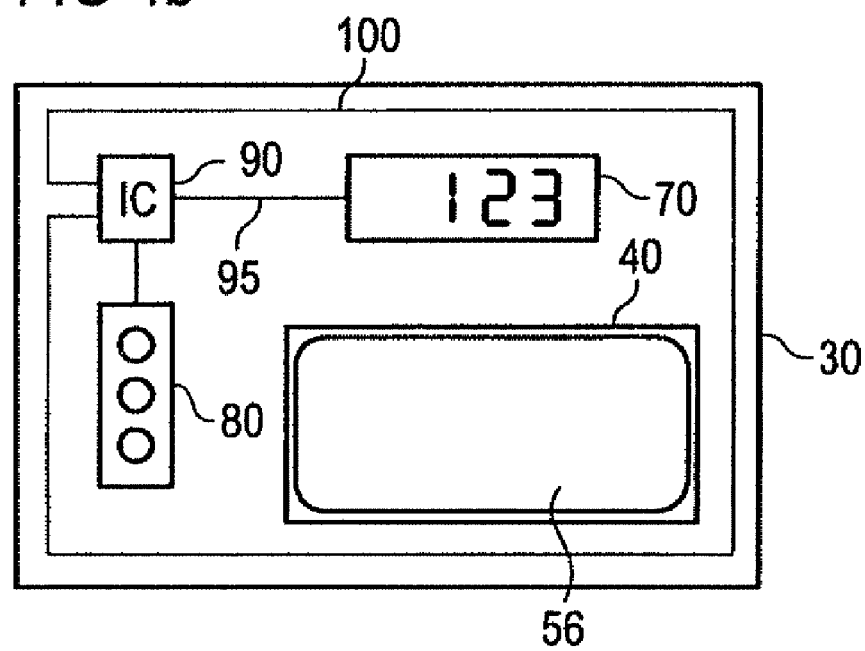

In the circuit carrier 30 of FIG. 4b only one through opening 56 is formed in the surface area 40 of the circuit carrier 30, the shape and size of said opening in each case corresponding to the shape and size of the surface area 40. This means that substantially the complete surface area 40 is freed of circuit carrier material. A high embossing 65 in the embossing area 60 of the data carrier body 20 overlapping with the opening 56 thus is possible in any location of the surface area 40 just as easily as in a data carrier without integrated circuit carrier 30. When building up the data carrier body 20 and integrating the circuit carrier 30 the opening 56 has to be filled with data carrier material correspondingly, so as to prevent a formation of different thickness levels in the data carrier body 20. The same is applicable to the holes 54 in the circuit carrier 30 of FIG. 4*a*, provided that they exceed a certain size.

The invention claimed is:

1. A method for producing a portable card-shaped data carrier comprising the steps:
   supplying a planar circuit carrier having at least one surface area for receiving a high embossing;
   integrating the circuit carrier in a card-shaped data carrier body having an embossing area, wherein the embossing area overlaps with the at least one surface area of the planar circuit carrier;
   forming at least one through opening in the at least one surface area of the planar circuit carrier; and
   high embossing the data carrier body in the embossing area of the data carrier body above the at least one through opening, wherein the at least one through opening in the circuit carrier facilitates deformation of the data carrier body and the circuit carrier in the embossing area.

2. The method according to claim 1, wherein a plurality of through holes and/or through slits is formed in the at least one surface area of the circuit carrier.

3. The method according to claim 2, wherein the plurality of through holes and/or through slits is formed in a regular or irregular pattern in the at least one surface area of the circuit carrier.

4. The method according to claim 2, wherein the plurality of through holes and/or through slits is formed substantially distributed over the complete at least one surface area of the circuit carrier.

5. The method according to claim 2, wherein the plurality of through holes and/or through slits is formed in the at least one surface area of the circuit carrier in such a manner that, upon high embossing the data carrier body in the embossing area, the circuit carrier is deformable in the at least one surface area.

6. The method according to claim 2, wherein the plurality of through holes and/or through slits is formed in the at least one surface area of the circuit carrier in such sizes and such shapes that the data carrier body has a substantially constant thickness.

7. The method according to claim 1, wherein the at least one through opening is formed in the at least one surface area of the circuit carrier in a size and a shape that substantially correspond to the size and the shape of the embossing area overlapping with the surface area.

8. The method according to claim 1, wherein the at least one through opening is formed in the at least one surface area of the circuit carrier before the circuit carrier is integrated in the data carrier body.

9. The method according to claim 1, wherein the planar extent of the at least one surface area of the circuit carrier is chosen in such a fashion that it substantially corresponds to the planar extent of the embossing area of the data carrier body.

10. The use of a planar circuit carrier for producing a portable card-shaped data carrier using a method according to claim 1, wherein said planar circuit carrier is arranged to be integratable with a card-shaped data carrier body of the portable data carrier, said planar circuit carrier comprising at least one surface area of the circuit carrier having at least one through opening which is arranged to enable a high embossing of the data carrier body and the circuit carrier.

11. A portable data carrier, comprising,
   a card-shaped data carrier body having an embossing area
   a planar circuit carrier integrated in the card-shaped data carrier body of the portable data carrier, said planar circuit carrier having at least one surface area comprising at least one through opening,; and
   at least one high embossing,
   wherein the embossing area overlaps with the at least one surface area of the integrated circuit carrier in such a way that the at least one high embossing is above the at least one through opening in the circuit carrier so that said at least one through opening is arranged to enhance deformation of the data carrier body and the circuit carrier in the embossing area.

12. The data carrier according to claim 11, wherein the at least one surface area of the integrated circuit carrier has a plurality of through holes and/or through slits.

13. The data carrier according to claim 12, wherein the plurality of through holes and/or through slits forms a regular or irregular pattern in the at least one surface area of the integrated circuit carrier.

14. The data carrier according to claim 12, wherein the plurality of through holes and/or through slits is distributed substantially over the complete at least one surface area of the integrated circuit carrier.

15. The data carrier according to claim 12, wherein the through holes and/or through slits have such sizes and such shapes in the at least one surface area of the integrated circuit carrier that the data carrier body has a substantially constant thickness.

16. The data carrier according to claim 11, wherein the at least one through opening has a size and a shape in the at least one surface area of the integrated circuit carrier which in each case substantially corresponds to the size and the shape of the embossing area overlapping with the surface area.

17. The data carrier according to claim 11, wherein the planar extent of the at least one surface area of the integrated circuit carrier substantially corresponds to the planar extent of the embossing area of the data carrier body.

18. The data carrier according to claim 11, including an output device and/or an input device, whose controlling electronics in each case are provided outside the at least one surface area on the integrated circuit carrier.

19. A planar circuit carrier for producing a portable data carrier arranged to be integratable with a card-shaped data carrier body of the portable data carrier, comprising at least one surface area of the circuit carrier having at least one through opening which is arranged to enable a high embossing of the data carrier body and the circuit carrier.

20. The circuit carrier according to claim 19, wherein the at least one surface area has a plurality of through holes and/or through slits.

21. The circuit carrier according to claim 20, wherein the plurality of through holes and/or through slits forms a regular or irregular pattern in the at least one surface area.

22. The circuit carrier according to claim 19, wherein the plurality of through holes and/or through slits is distributed substantially over the complete at least one surface area.

23. The circuit carrier according to claim 19, wherein the at least one through opening has a size and a shape in the at least one surface area which in each case corresponds substantially to the size and shape of the at least one surface area

* * * * *